US012292803B2

United States Patent
Sun et al.

(10) Patent No.: US 12,292,803 B2
(45) Date of Patent: May 6, 2025

(54) PROVIDING MANAGED BACKTRACE ABILITY FOR VIRTUAL DESKTOP INFRASTRUCTURE (VDI)

(71) Applicant: Omnissa, LLC, Mountain View, CA (US)

(72) Inventors: Yue Sun, Beijing (CN); Mandy Yang, Beijing (CN); Yanni Wu, Beijing (CN); Yuheng Zhang, Beijing (CN); Qiaodong Wang, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 18/447,717

(22) Filed: Aug. 10, 2023

(65) Prior Publication Data

US 2025/0028610 A1     Jan. 23, 2025

(30) Foreign Application Priority Data

Jul. 17, 2023   (WO) ................ PCT/CN2023/107716

(51) Int. Cl.
  *G06F 16/00*     (2019.01)
  *G06F 9/451*     (2018.01)
  *G06F 11/14*     (2006.01)

(52) U.S. Cl.
  CPC .......... *G06F 11/1469* (2013.01); *G06F 9/452* (2018.02); *G06F 2201/84* (2013.01)

(58) Field of Classification Search
  CPC ... G06F 11/1469; G06F 9/452; G06F 2201/84
  See application file for complete search history.

(56) References Cited

U.S. PATENT DOCUMENTS

| | | | | |
|---|---|---|---|---|
| 12,066,904 B2* | 8/2024 | Juniwal | ............... | G06F 11/1484 |
| 2011/0214176 A1* | 9/2011 | Burch | ................. | G06F 9/45533 |
| | | | | 718/1 |
| 2016/0014107 A1* | 1/2016 | Hamauzu | ................ | H04L 63/10 |
| | | | | 726/5 |
| 2020/0364354 A1* | 11/2020 | Schwartz | .............. | G06F 21/604 |
| 2021/0124648 A1* | 4/2021 | Srinivasan | .......... | G06F 11/1451 |

(Continued)

OTHER PUBLICATIONS

Egger et al., "Efficiently Restoring Virtual Machines",2013, Springer Science+Business Media New York, pp. 421-439 (Year: 2013).*

(Continued)

*Primary Examiner* — Alexander Khong
(74) *Attorney, Agent, or Firm* — Kim & Stewart LLP

(57) ABSTRACT

A system and method for saving and restoring snapshots of a client device connected to a virtual desktop are disclosed. When a client device makes a request to capture the state of the virtual desktop, the request is sent to a server if the client device and virtual desktop are authorized according to a policy. The request may also specify that the virtual desktop's memory contents be captured. The server forms the snapshot and saves the snapshot in storage. When a client device makes a request to restore the virtual desktop, the client selects one of the saved snapshots and restores the virtual desktop, including its memory, when the client device and desktop are authorized, and the snapshot has not exceeded its allowed time in storage according to the policy.

17 Claims, 7 Drawing Sheets

(56) References Cited

U.S. PATENT DOCUMENTS

2021/0124651 A1* 4/2021 Srinivasan ............ G06F 9/5077
2022/0215111 A1* 7/2022 Ekins .................... G06F 21/604
2023/0342262 A1* 10/2023 Revanna ................ G06F 3/065
2024/0160605 A1* 5/2024 Katuri ................... G06F 16/128
2024/0205235 A1* 6/2024 Batni .................... H04L 63/107

OTHER PUBLICATIONS

Tileka et al., "Virtual Desktop System", 2018, IJARCCE, pp. 216-220 (Year: 2018).*

* cited by examiner

PROVIDING MANAGED BACKTRACE ABILITY FOR VIRTUAL DESKTOP INFRASTRUCTURE (VDI)

BACKGROUND

In the current virtual desktop infrastructure (VDI) systems, there are two difficulties. From the end-user's point of view, when a remote desktop is connected, all operations are unidirectional in the timeline, and it is difficult for the user to save the state of the desktop at a certain moment and roll back that state after performing some series of operations. From the administrator's point of view, getting all the real-time data of a particular desktop at a particular time is difficult, so auditing or troubleshooting with existing techniques is based on a log or a user's description. It is desirable to avoid these difficulties.

SUMMARY

One embodiment provides a method for capturing and restoring a virtual desktop for a client device. The method includes making a request that a state of the virtual desktop for the client device be captured as a snapshot and saved in storage, sending the request to a server, where the server, in response to the request, takes the snapshot and adds the snapshot to storage when the request accords with an authorization policy, requesting that the virtual desktop for the client device be restored according to the snapshot maintained in storage, restoring the state of the virtual desktop for the client device when the client device requests restoration according to the authorization policy.

Further embodiments include a computer-readable medium containing instructions for carrying out one more aspects of the above method and a computer system configured to carry out one or more aspects of the above method.

DETAILED DESCRIPTION

Figure 1A:
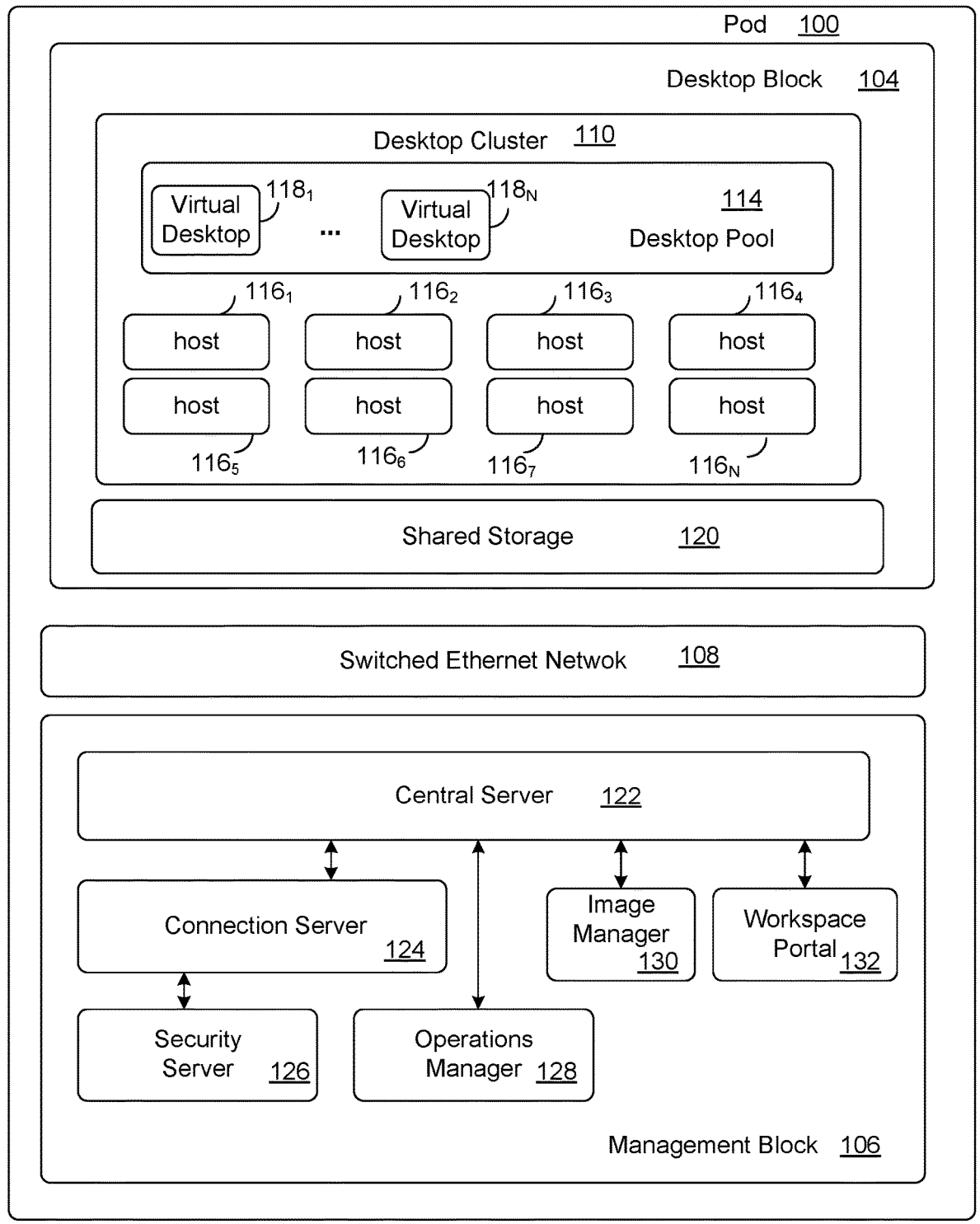
FIG. 1A depicts an infrastructure for supporting a plurality of virtual desktop clients, in an embodiment.

Techniques described herein provide the ability to capture snapshots of a virtual desktop and restore the virtual desktop to a previous state based on such a snapshot in a configurable, policy-governed manner. While existing remote and virtual desktop systems only allow operations to be performed in a unidirectional manner, embodiments of the present disclosure make use of capabilities provided by an underlying virtualization system with which a virtual desktop infrastructure (VDI) system is implemented to provide snapshot functionality for virtual desktops while overcoming issues related to integrating snapshot functionality with a VDI system through a particular policy-governed framework.

For example, as described in more detail below with respect to FIG. 2, certain embodiments involve providing administrators with the ability to configure snapshot policies for virtual desktops, such as governing which users can request snapshots, which virtual desktops are available for snapshot functionality (e.g., for certain users), how many snapshots can be maintained for each user, how long snapshots can be maintained, and the like. In some embodiments, policies are stored at the virtual desktop clients and/or virtual desktop server and/or are maintained in a connection server. As described in more detail below with respect to FIGS. 3-5, a user of a virtual desktop client (e.g., VDI client) may request that a snapshot be taken of a virtual desktop and, if the virtual desktop client determines that the request is authorized by one or more applicable policies (e.g., which may be determined based on communication with one or more components such as a connection server), the user's request may be passed to the virtual desktop server (e.g., VDI server). The virtual desktop server may send a request to the underlying virtualization platform to create a snapshot of the virtual desktop, and the snapshot may be stored.

In certain embodiments, a user of the virtual desktop client may request to restore a virtual desktop to an earlier state based on a snapshot. If the virtual desktop client determines that the request is authorized by one or more applicable policies (e.g., which may be determined based on communication with one or more components such as a connection server), the virtual desktop client may obtain a set of available snapshots, select a snapshot, and initiate a revert operation according to the selected snapshot. It is noted that terms such as restore and revert may be used to describe a "backtracing" process by which a virtual desktop is rolled back to an earlier state based on a snapshot. For example, the revert operation may involve the participation of the virtual desktop server and/or the underlying virtualization platform and may or may not require rebooting the virtual desktop, depending on whether the selected snapshot includes the contents of the virtual desktop memory. In some embodiments, a configurable parameter at either the server or client side (e.g., the parameter may be included in a request) is used to determine whether or not a snapshot is created with the contents of the virtual desktop's memory. For example, a snapshot that includes memory contents can be used to restore the virtual desktop to an earlier state without rebooting, while a snapshot that does not include memory contents can only be used to restore the virtual desktop to an earlier state with a reboot.

FIG. 1A depicts an infrastructure for supporting a plurality of virtual desktop clients, in an embodiment. As shown, pod 100 is a scalable and modular portion of the infrastructure that can support many thousands of virtual desktops and virtual desktop clients, where a virtual desktop is an application running in the infrastructure and a virtual desktop client is an application in a client device that is usually remote from the infrastructure and coupled to one of the virtual desktop applications $118_{1-N}$. Pod 100 includes a desktop block 104 and a management block 106, both of which are coupled to a switched Ethernet network 108 for communication.

Desktop block 104 includes a desktop cluster 110, which is a set of interoperating hosts $116_{1-N}$ and at least one desktop pool 114. Hosts $116_{1-N}$ are general-purpose computers having virtualization software for creating and managing a large number of virtual compute instances, such as virtual machines. For example, such hosts can be ESXi hosts from VMware®. Desktop pool 114 contains a large number of virtual compute instances, each of which has been provisioned to run virtual desktop application $118_{1-N}$ and is available to be assigned and connected to a virtual desktop client when a user of a virtual desktop client software 190 selects one of the virtual desktop applications $118_{1-N}$ for use. In one embodiment, a virtual desktop application is a Windows® 10 desktop.

Management block 106 includes a number of applications that manage desktop block 104. These applications include a central server 122, a connection server 124, a security server 126, an operations manager 128, a workspace portal 132, and a virtual desktop image manager 130.

Central server 122 manages hosts $116_{1-N}$ and provisions virtual compute instances to run virtual desktop applications $118_{1-N}$.

Security server 126 provides secure external access to virtual desktop applications $118_{1-N}$.

Operations manager 128 manages configurations and performance of the virtual compute instances running virtual desktop applications $118_{1-N}$.

Workspace portal 132 provides a store of applications for use in the virtual desktop application and the virtual desktop client.

Virtual desktop image manager 130 manages images that are displayed on the virtual desktop clients.

In one embodiment, central server 122 is a server running VMware® vCenter software, connection server 124 is a VMware® View Connection Server, security server 126 is a VMware® View Security Server, operations manager 128 is a VMware®vRealize Operations Manager, workspace portal 132 is a VMware® Workspace Portal and virtual desktop image manager 130 is a VMware® Mirage software application. In some embodiments, each of these applications runs in a virtual computing instance, such as a virtual machine or container.

Figure 1B:
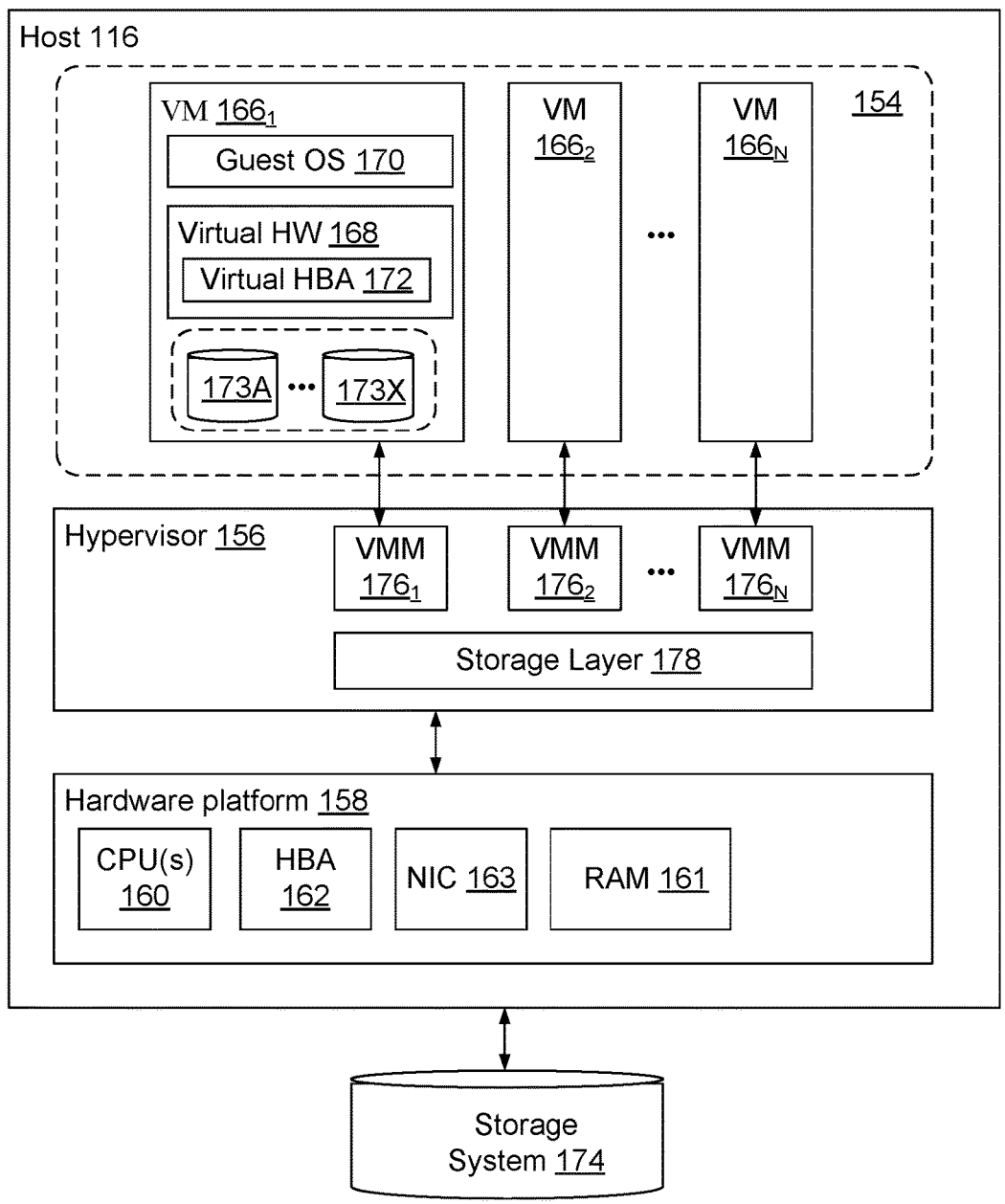
FIG. 1B illustrates additional components of a computing environment in which embodiments of the present disclosure may be implemented.

FIG. 1B illustrates additional components of a computing environment in which embodiments of the present disclosure may be implemented. Host 116 generally represents hosts $116_{1-N}$ of FIG. 1A. Host 116 includes a set 154 of virtual machines (VMs) $166_{1-N}$, a software interface layer referred to as a hypervisor 156, which enables sharing of a hardware platform 158 by VMs $166_{1-N}$. One example of hypervisor 156 is a VMware® ESXi hypervisor provided as part of the VMware® vSphere solution made commercially available from VMware®, Inc.

In some embodiments, host 116 is coupled to a storage system 174, which is implemented as software-defined storage, such as VMware® Virtual Storage Area Network (SAN) or VSAN, which groups together server-attached hard disks and/or solid-state drives (HDDs and/or SSDs) to create a flash-optimized, highly resilient shared data store designed for virtual environments.

Host 116 generally comprises a general-purpose computer system having one or more virtual machines accessing data stored on a storage system 174 communicatively connected to host 116.

In certain embodiments, the hardware platform 158 on which the host is constructed is a conventional, typically server-class, hardware platform 158. Hardware platform 158 of host 116 generally includes conventional physical components of a computing device, such as one or more processors (CPUs) 160, a random access memory (RAM) 161, a disk interface 162 (host bus adapter (HBA)), and a network interface card (NIC) 163. CPU 160 is configured to execute instructions, for example, executable instructions that perform one or more operations described herein and are stored in RAM 161. RAM 161 and storage system 174 are devices allowing information, such as executable instructions, virtual disks, configurations, and other data, to be stored and retrieved. In certain embodiments, RAM 161 includes one or more memory modules.

Storage system 174 generally includes one or more locally attached storage devices, for example, one or more hard disks, flash memory modules, solid-state disks, and optical disks. In some embodiments, storage system 174 includes a shared storage system having one or more storage arrays of any type, such as network-attached storage (NAS) or a block-based device over a storage area network (SAN). Disk interface 162, such as a host bus adapter (HBA), enables host 116 to communicate with a storage device, such as storage system 174, to store virtual disks $173_{A-X}$ that are accessed by VMs $166_{1-N}$ via virtual disk interface 172 (vHBA). Network interface controller (NIC) 163 enables host 116 to communicate with another device via a communication medium, such as a communication network (e.g., network 108 of FIG. 1A).

While storage system 174 is typically made up of a plurality of disks, other forms of storage, such as solid-state non-volatile storage devices, may be used. The term "disk" herein should, therefore, not be construed as limited only to rotating disk storage media but may also be construed to encompass solid-state disks, or "SSDs." In some embodiments, storage system 174 is comprised of high-density non-volatile memory. Furthermore, while storage system 174 is depicted as a separate, external component to host 116, storage system 174 may alternatively be internal to host 116, for example, a local storage device or locally attached storage.

As shown in FIG. 1B, a hypervisor 156 is installed on top of hardware platform 158 and supports multiple virtual machines (VMs) $166_1$-$166_{6N}$. In certain embodiments, each such virtual machine VMs $166_1$-$166_{6N}$ implements a virtual hardware platform 168 that supports the installation of a guest operating system (OS) 170, which is capable of executing one or more applications (not shown). Examples of a guest OS 170 include any of the well-known commodity operating systems, such as the Microsoft Windows® operating system, the Linux® operating system, and the like. Persistent storage space for VMs $166_{1-N}$ is managed by the storage layer 178 in hypervisor 156 via VMM layers $176_1$ to $176_{6N}$. In some embodiments, hypervisor 156 runs on top of a host operating system of host 116, while in other embodiments, hypervisor 156 runs directly on hardware components, such as hardware platform 158 of host 116.

It should be recognized that the various terms, layers, and categorizations used to describe the virtualization components in FIG. 1B may be referred to differently without departing from their functionality or the spirit or scope of the invention. For example, VMMs $176_{1-N}$ may be considered separate virtualization components between VMs $166_{1-N}$ and hypervisor 156 (which, in such a conception, may itself be considered a virtualization "kernel" component) since there exists a separate VMM for each instantiated VM. Alternatively, each VMM $176_{1-N}$ may be considered to be a component of its corresponding virtual machine since each such VMM $176_{1-N}$ includes the hardware emulation components for the virtual machine. In such an alternative conception, for example, the conceptual layer described as a virtual hardware platform is merged with and into VMM $176_{1-N}$ such that each virtual host bus adapter 172 (virtual HBA) is removed from FIG. 1B (i.e., since its functionality is effectuated by a host bus adapter emulator within VMM $176_{1-N}$).

Figure 1C:
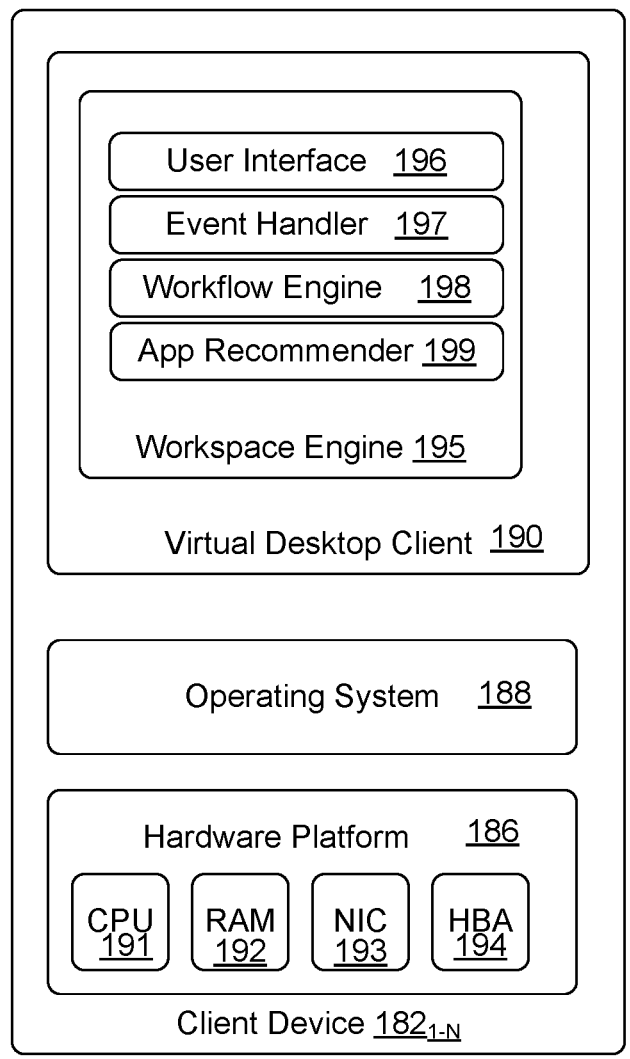
FIG. 1C depicts a virtual desktop client device, in an embodiment.

FIG. 1C depicts a virtual desktop client device, in an embodiment. Each virtual desktop client device $182_{1-N}$ includes an operating system 188 and a hardware platform 186. Hardware platform 186 includes one or more CPUs 191, a RAM 192, a network interface controller (NIC) 193, and a host bus adapter (HBA) 194. Each virtual desktop client device $182_{1-N}$ runs virtual desktop client software 190, which in turn includes a workspace engine 195.

Workspace engine 195 includes a set of facilities or services, such as an interface 196 for the user, an event handler 197, a workflow engine 198, and an application recommender 199. By opening user interface 196 of workspace engine 195, the user of client device $182_{1-N}$ connects to and accesses one of the virtual desktop applications $118_{1-N}$ (also referred to as virtual desktops). Image frames of one of the virtual desktop applications $118_{1-N}$ are transmitted to associated one of the client devices $182_{1-N}$ by virtual desktop image manager 130 at a certain frame rate in formats such as bitmap, raster graphic image, or vector graphics image. In certain embodiments, image frames are transmitted using a desktop delivery protocol such as VMware® Blast™ or Microsoft® Remote Desktop Protocol (RDP)™. In some embodiments, workflow engine 198 allows the user of client device $182_{1-N}$ to specify a protocol for use in delivering the virtual desktop for display within user interface 196.

After transmission, the image frames are displayed on client device $182_{1-N}$ for interaction by the user within user interface 196. Client device $182_{1-N}$ sends user inputs to the associated one of the virtual desktop applications $118_{1-N}$ for processing, thereby taking the processing load off of client device $182_{1-N}$. For example, graphically selecting an item, say with a mouse, on user interface 196 is captured by event handler 197 in workspace engine 195, which sends a message to the associated one of the virtual desktop applications $118_{1-N}$ connected to client device $182_{1-N}$ regarding the selection.

Event handler 197 also supports drag-and-drop operations on user interface 196.

Workflow engine 198 is a facility of workspace engine 195 that supports designing, managing, and executing workflows based on a workflow template.

Application recommender 199 is a facility that associates applications with resources, such as files that are displayed as icons on user interface 196.

Such centralized and automated management of virtualized desktops provides increased control and cost savings. In certain embodiments, the client device runs VMware® View™ or another special purpose thin client within user interface 196.

Figure 3:
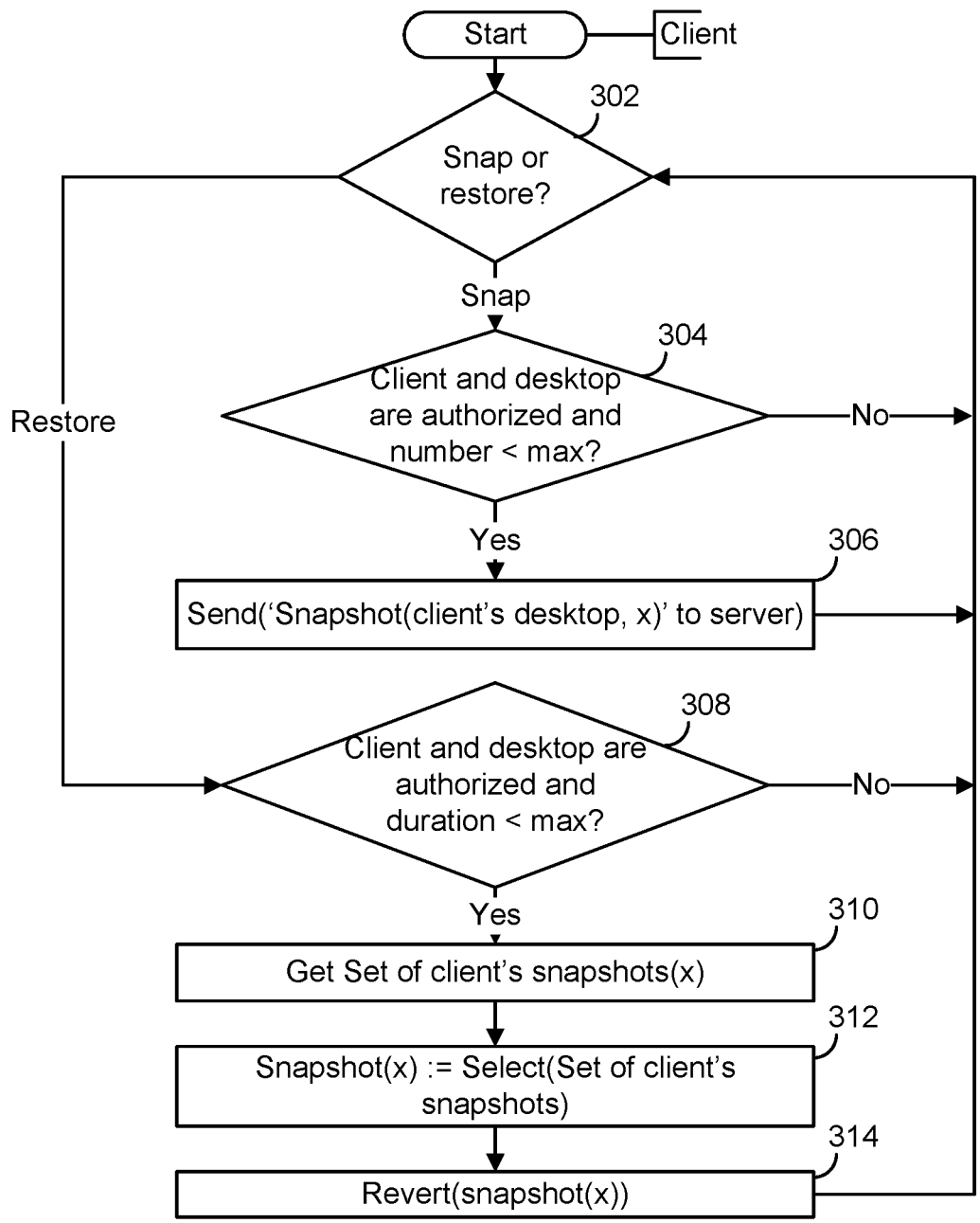
FIG. 3 depicts a flow of operations by a client, in an embodiment.
Figure 4:
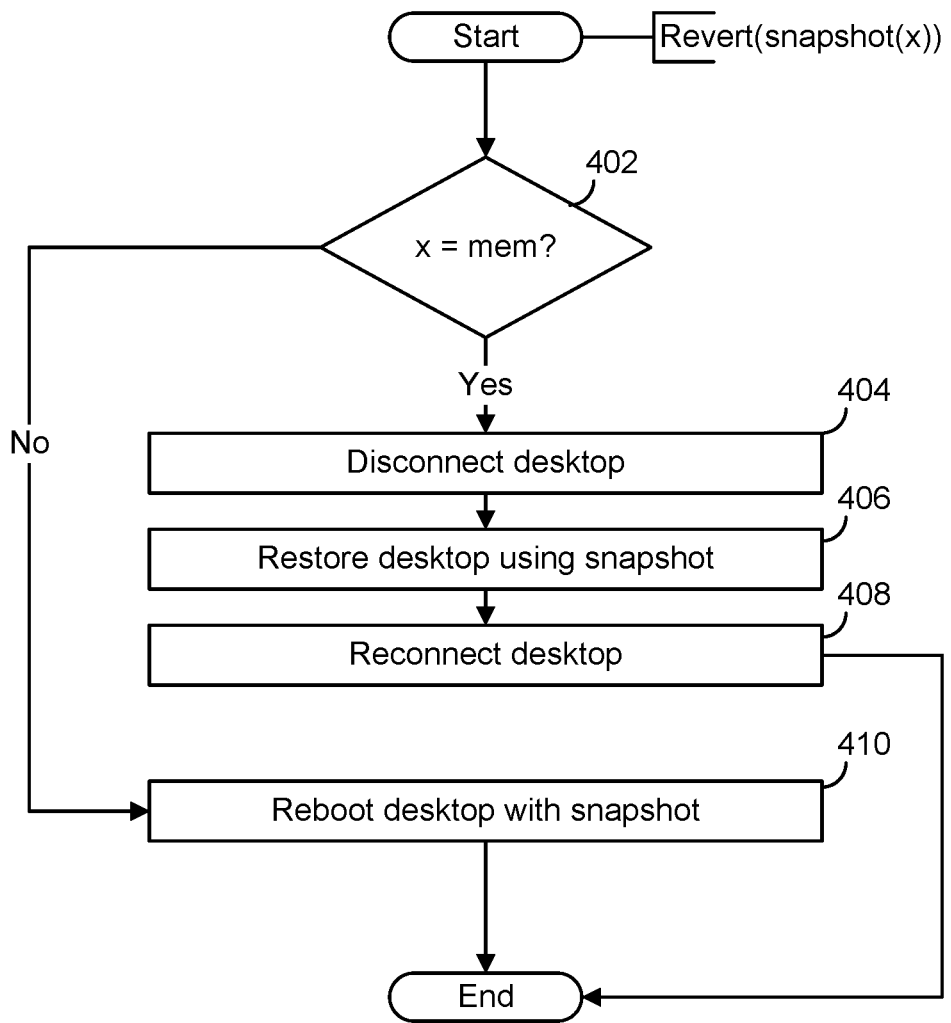
FIG. 4 depicts a flow of operations of the revert function, in an embodiment.
Figure 5:
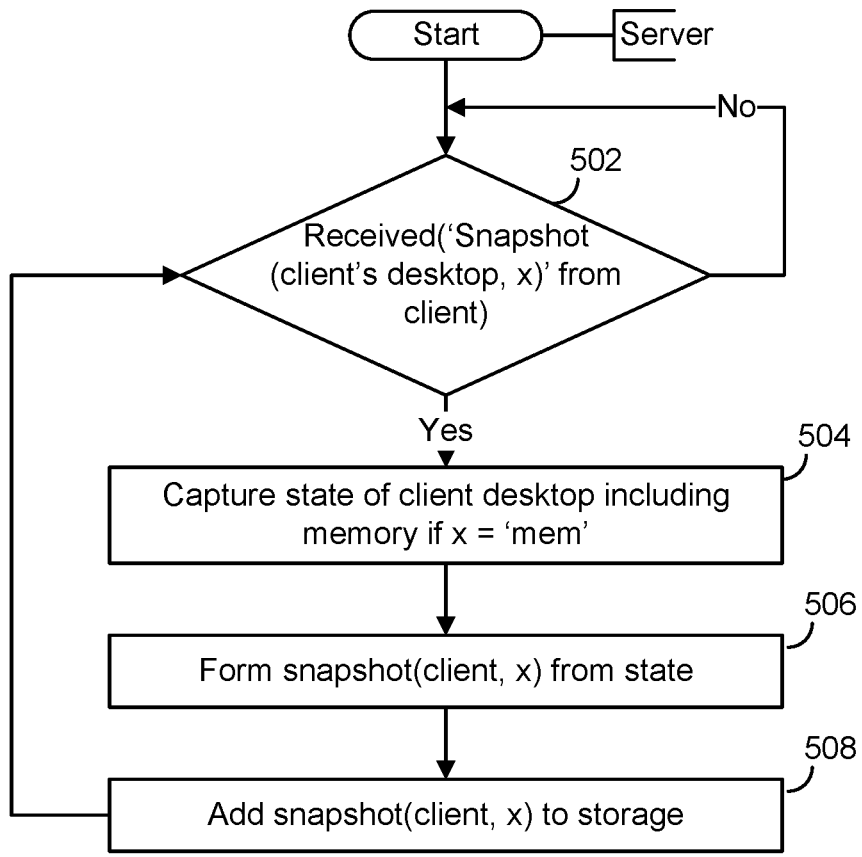
FIG. 5 depicts a flow of operations for the server, in an embodiment.

Providing a way to save an image of a desktop is helpful to the client as a way to protect against downtime of the desktop and to backup their work. FIGS. 3-5 provide such a feature according to a policy set by the administrator, as depicted in FIG. 2.

Figure 2:
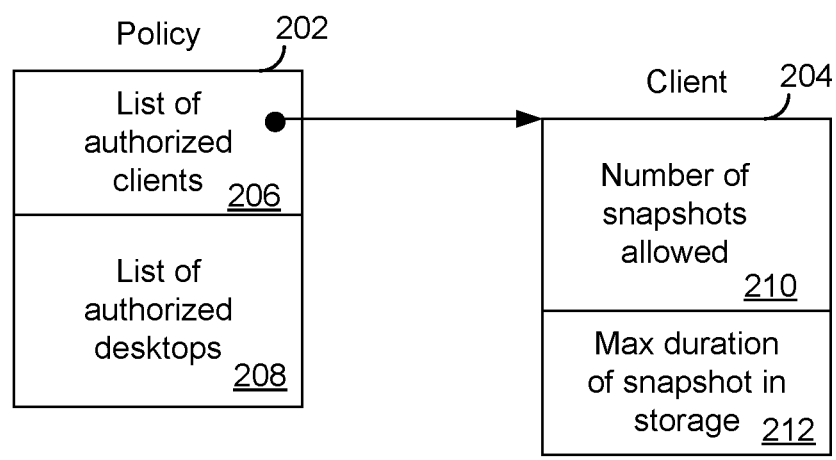
FIG. 2 depicts a flow of operations by a client, in an embodiment.

FIG. 2 depicts a policy set by an administrator for controlling client snapshots. The policy 202 includes a list of authorized clients 206 and a list of authorized virtual desktops 208. For each authorized client, as depicted in policy portion 204, policy 202 includes a maximum number of snapshots 210 allowed to be saved in storage system 174 and a maximum duration 212 of a client snapshot in storage system 174. Policy 202 guides the flow of operations depicted in FIG. 3 and FIG. 4. In an embodiment, connection server 124 maintains policy 202.

FIG. 3 depicts a flow of operations by a client, in an embodiment. In step 302, the client device requests either a snapshot or a restore operation. If a snapshot is selected as determined by step 302, then connection server 124 determines whether the client device is authorized to perform the snapshot, whether the client's virtual desktop is authorized, and whether the number of snapshots does not exceed the maximum allowed number, according to policy 202. If the client device is so authorized, as determined in step 304, the client device sends a message to connection server 124 in step 306 to perform the snapshot of the client's desktop. A parameter x in the message determines whether the server takes a snapshot that includes the entire contents of the memory of the client's desktop. The snapshot is placed in storage system 174.

If the client device selects a restore operation in step 302, then connection server 124 determines whether the client device is authorized to perform a restoration, whether the client's desktop is authorized, and whether the duration of the snapshot in storage has not been exceeded, according to policy 202 maintained by connection server 124. If so, as determined in step 308, then in step 310, the client device obtains a set of the client's snapshots in storage and selects one of the snapshots in step 312 for reverting. In step 314, the selected snapshot is reverted according to the function of FIG. 3. Again, the parameter x determines whether the snapshot is one that includes the memory of the client's desktop.

FIG. 4 depicts a flow of operations of the revert function, in an embodiment. In step 402, the function determines whether the parameter x is set to 'mem.' If so, in step 404, the function disconnects the desktop if the desktop is still connected, restores the desktop according to the snapshot in step 406, and then reconnects the desktop in step 408 after confirming the recovery. At this point, the client's desktop is rolled back directly to the state of the particular snapshot, including the desktop layout, applications, and even files that were not saved in the editor at the time of the snapshot.

If parameter x is not set to 'mem' as determined in step 402, then the function reboots the desktop using the snapshot in step 410, but the desktop's memory is not restored.

FIG. 5 depicts a flow of operations for the server, in an embodiment. In step 502, the server determines whether it has received a snapshot request from the client. If so, in step 504, the server captures the state of the client desktop including the memory, if the parameter x is set to 'mem.' In step 506, the server forms the snapshot from the captured state. In step 508, the server adds the snapshot to storage.

If the administrator refreshes or significantly upgrades the client's desktop, any existing client snapshot is removed to prevent the desktop from going into an unmanaged state. The administrator can take advantage of VDI's support for snapshots by examining the failure site for troubleshooting. The administrator can also set an audit policy that periodically maintains the status of the VM running the desktop.

Certain embodiments as described above involve a hardware abstraction layer on top of a host computer. The hardware abstraction layer allows multiple contexts to share the hardware resource. These contexts are isolated from each other in one embodiment, each having at least a user application program running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application program runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application program and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application program's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for capturing and restoring a virtual desktop for a client device, the method comprising:
  receiving, from the client device at a connection server, a request that a state of the virtual desktop for the client device be captured as a snapshot and saved in storage;
  retrieving an authorization policy for the client device by the connection server;
  determining, by the connection server, a maximum number of snapshots allowed to be saved in the storage for the client device that is specified by the authorization policy;
  determining, by the connection server, that capturing the snapshot will not exceed the maximum number of snapshots for the client device specified by the authorization policy;
  sending the request from the connection server to a virtual desktop server, wherein the virtual desktop server, in response to the request, captures the snapshot and stores the snapshot in the storage;
  receiving, by the connection server from the client device, a restore request that the virtual desktop for the client device be restored according to the snapshot maintained in the storage;
  determining, by the connection server, that the restore request is allowed by the authorization policy; and
  sending the restore request to the virtual desktop server, wherein the virtual desktop server restores the state of the virtual desktop for the client device.

2. The method of claim 1, wherein the authorization policy specifies:
  a set of authorized client devices;
  a set of authorized virtual desktops;
  the maximum number of snapshots of each client device allowed in the storage; and
  a maximum duration of snapshots of each client device in the storage.

3. The method of claim 1, wherein the snapshot includes memory contents of the virtual desktop for the client device.

4. The method of claim 1, wherein restoring the state includes:
  disconnecting the client device from the virtual desktop;
  restoring the state of the virtual desktop according to the snapshot; and
  reconnecting the client device to the virtual desktop.

5. The method of claim 1, wherein the snapshot does not include memory contents of the virtual desktop for the client device.

6. The method of claim 5, wherein restoring the state includes rebooting the virtual desktop for the client device according to the snapshot.

7. A system for capturing and restoring a virtual desktop of a client device, the system comprising:
  a storage system;
  at least one host computer system connected to the storage system and including a virtual desktop server running the virtual desktop;

the client device capable of connecting to the virtual desktop and running a virtual desktop client; and a connection server capable of connecting to the client device and the host computer system, wherein the connection server is configured to:
  receive, from the client device, a request that a state of the virtual desktop for the client device be captured as a snapshot and saved in the storage system;
  retrieve an authorization policy for the client device;
  determine a maximum number of snapshots allowed to be saved in the storage system for the client device that is specified by the authorization policy;
  determine that capturing the snapshot will not exceed the maximum number of snapshots for the client device specified by the authorization policy;
  send the request to the virtual desktop server, wherein the virtual desktop server, in response to the request, captures the snapshot and stores the snapshot in the storage system;
  receive, from the client device, a restore request that the virtual desktop for the client device be restored according to the snapshot maintained in the storage system;
  determine that the restore request is allowed by the authorization policy; and
  send the restore request to the virtual desktop server, wherein the virtual desktop server restores the state of the virtual desktop for the client device.

8. The system of claim 7, wherein the authorization policy specifies:
  a set of authorized client devices;
  a set of authorized virtual desktops;
  the maximum number of snapshots of each client device allowed in the storage system; and
  a maximum duration of snapshots of each client device in the storage system.

9. The system of claim 7, wherein the snapshot includes memory contents of the virtual desktop for the client device.

10. The system of claim 7, wherein restoring the state of the virtual desktop further comprises:
  disconnecting the client device from the virtual desktop;
  restoring the state of the virtual desktop according to the snapshot; and
  reconnecting the client device to the virtual desktop.

11. The system of claim 7, wherein the snapshot does not include the memory contents of the virtual desktop for the client device.

12. The system of claim 11, wherein restoring the state further includes rebooting the virtual desktop for the client device according to the snapshot.

13. A non-transitory computer-readable medium comprising instructions, wherein the instructions are executed by one or more processors to carry out a method for capturing and restoring a virtual desktop for a client device, the method comprising:
  receiving, from the client device at a connection server, a request that a state of the virtual desktop for the client device be captured as a snapshot and saved in storage;
  retrieving an authorization policy for the client device by the connection server;
  determining, by the connection server, a maximum number of snapshots allowed to be saved in the storage for the client device that is specified by the authorization policy;
  determining, by the connection server, that capturing the snapshot will not exceed the maximum number of snapshots for the client device specified by the authorization policy;
  sending the request from the connection server to a virtual desktop server, wherein the virtual desktop server, in response to the request, captures the snapshot and stores the snapshot in the storage;
  receiving, by the connection server from the client device, a restore request that the virtual desktop for the client device be restored according to the snapshot maintained in the storage;
  determining, by the connection server, that the restore request is allowed by the authorization policy; and
  sending the restore request to the virtual desktop server, wherein the virtual desktop server restores the state of the virtual desktop for the client device.

14. The non-transitory computer-readable medium of claim 13, wherein the authorization policy specifies:
  a set of authorized client devices;
  a set of authorized virtual desktops;
  the maximum number of snapshots of each client device allowed in the storage; and
  a maximum duration of snapshots of each client device in the storage.

15. The non-transitory computer-readable medium of claim 13, wherein the snapshot includes memory contents of the virtual desktop for the client device.

16. The non-transitory computer-readable medium of claim 13, wherein restoring the state further comprises:
  disconnecting the client device from the virtual desktop;
  restoring the state of the virtual desktop according to the snapshot; and
  reconnecting the client device to the virtual desktop.

17. The non-transitory computer-readable medium of claim 13,
  wherein the snapshot does not include the memory contents of the virtual desktop for the client device; and
  wherein restoring the state further comprises rebooting the virtual desktop for the client device according to the snapshot.

* * * * *